(12) United States Patent
Lee et al.

(10) Patent No.: US 9,817,128 B2
(45) Date of Patent: Nov. 14, 2017

(54) METHOD OF GENERATING CORRELATION FUNCTION WITH NO SIDE-PEAK AND SYSTEM FOR TRACKING BINARY OFFSET CARRIER SIGNAL

(75) Inventors: Youngpo Lee, Suwon-si (KR); Dahae Chong, Suwon-si (KR); Junhwan Kim, Suwon-si (KR); Seung Goo Kang, Suwon-si (KR); Seokho Yoon, Suwon-si (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 633 days.

(21) Appl. No.: 14/125,734

(22) PCT Filed: Nov. 2, 2011

(86) PCT No.: PCT/KR2011/008262
§ 371 (c)(1),
(2), (4) Date: Jan. 17, 2014

(87) PCT Pub. No.: WO2013/012133
PCT Pub. Date: Jan. 24, 2013

(65) Prior Publication Data
US 2014/0125522 A1    May 8, 2014

(30) Foreign Application Priority Data
Jul. 19, 2011   (KR) .......................... 10-2011-0071323

(51) Int. Cl.
G08C 17/02     (2006.01)
G01S 19/29     (2010.01)
(Continued)

(52) U.S. Cl.
CPC .............. *G01S 19/29* (2013.01); *G01S 19/01* (2013.01); *G01S 19/13* (2013.01); *G01S 19/30* (2013.01)

(58) Field of Classification Search
CPC ...................................................... G01S 19/29
(Continued)

(56) References Cited

U.S. PATENT DOCUMENTS 3,982,245 A * 9/1976 Soule, Jr. ............. H01Q 3/2629
                                                        342/379
7,471,241 B1 * 12/2008 Yang .................... G01C 21/206
                                                        342/357.73
(Continued)

FOREIGN PATENT DOCUMENTS

KR    10-0835891 B1    6/2008
KR    10-2010-0053956 A    5/2010

OTHER PUBLICATIONS

Kim, Sanghun, et al. "A Novel Side-Peak Cancellation Method for BOC Signal Synchronization" The Journal of Korea Information and Communications Society, 34.1 (2009) 131-137.
(Continued)

*Primary Examiner* — Sean P Burke
(74) *Attorney, Agent, or Firm* — NSIP Law

(57) ABSTRACT

Disclosed herein are a method of generating a correlation function with no side-peak and a system for tracking a BOC signal in order to synchronize the BOC signal. The method of generating a correlation function includes step S1 of generating sub-correlation functions $\{S_i(\tau)\}_{i=0}^{N-1}$, step S2 of generating a first final correlation function $R_0(\tau)$ by combining some of the sub-correlation functions, and step S3 of generating a second final correlation function $R_{proposed}(\tau)$ by combining $R_0(\tau)$ with each of the remaining sub-correlation functions that have not been used for the com-
(Continued)

bination at step S2. The BOC signal is one or more of $BOC_{sin}(kn,n)$ and $BOC_{cos}(kn,n)$ signals.

11 Claims, 6 Drawing Sheets

(51) Int. Cl.
*G01S 19/01* (2010.01)
*G01S 19/13* (2010.01)
*G01S 19/30* (2010.01)

(58) Field of Classification Search
USPC .................................................. 342/357.68
See application file for complete search history.

(56) References Cited

U.S. PATENT DOCUMENTS

| | | | | |
|---|---|---|---|---|
| 7,764,226 B1 * | 7/2010 | Veitsel | ............... | G01S 19/33 342/357.73 |
| 8,229,031 B2 * | 7/2012 | Schmid | ............... | G01S 19/24 342/451 |
| 2008/0159198 A1 * | 7/2008 | Chen | ............... | G01S 19/30 370/315 |
| 2011/0254732 A1 * | 10/2011 | Martin | ............... | G01S 19/30 342/357.59 |

OTHER PUBLICATIONS

Lee, Y., et al. "A new CBOC correlation function for next generation GNSS signal synchronization." J. Korean Inst. Commun. Sci. (KICS) 34.7 (2009): 724-729.

International Search Report dated Jun. 11, 2012 in counterpart International Application No. PCT/KR2011/008262.

* cited by examiner (a)

(b)

METHOD OF GENERATING CORRELATION FUNCTION WITH NO SIDE-PEAK AND SYSTEM FOR TRACKING BINARY OFFSET CARRIER SIGNAL

CROSS-REFERENCE TO RELATED APPLICATIONS

This application is a U.S. National Stage application of International Application No. PCT/KR2011/008262, filed on Nov. 2, 2011, which claims priority under 35 U.S.C. §119(e), 120 and 365(c) of Korean Patent Application No. 10-2011-0071323, filed on Jul. 19, 2011, in the Korean Intellectual Property Office.

BACKGROUND OF THE INVENTION

1. Field of the Invention

The present invention relates to a method of generating a correlation function in which side-peaks have been eliminated from an autocorrelation function in order to track binary offset carrier (BOC) signals, and a system for tracking a BOC signal using the method. More particularly, the present invention relates to a method of eliminating side-peaks from every type of BOC signal regardless of the type of phase of the sub-carrier of a BOC signal identified as $BOC_{sin}(kn,n)$ or $BOC_{cos}(kn,n)$ and the value of k, and a system for tracking a BOC signal using the method, where k is the ratio of the chip period $T_c$ of the pseudorandom noise (PRN) code to the period of the sub-carrier and n denotes the ratio of $T_c^{-1}$ to 1.023 MHz 2. Description of the Related Art BOC modulation is scheduled to be used for next generation global navigation satellite systems (GNSSs), such as Galileo and the modernized global positioning system (GPS).

In navigation satellite systems, a time synchronization error is directly related to a distance measurement error, and thus the accurate synchronization of a BOC signal is significantly important to the implementation of reliable navigation satellite systems.

BOC modulation has the characteristic of shifting energy from the center of a band to the side thereof, unlike a binary phase shift keying (BPSK) method that is used in a GPS. This characteristic allows the BOC-based global navigation satellite system (GNSS) to share a spectrum with existing signals, thereby enabling the GPS and Galileo to achieve frequency band sharing. In addition, due to the characteristic of the sharpness of the peak of the BOC autocorrelation, more accurate positioning can be performed on the assumption that accurate synchronization has been established. Precise synchronization is required to utilize the above-described advantages of BOC modulation. Signal synchronization is performed based on a peak of the autocorrelation. Although other existing signals do not cause any problem because they produce a single peak, a BOC signal undergoes difficulty performing synchronization because multiple peaks occur in the autocorrelation.

One of the most important problems of Galileo is a BOC signal tracking problem. Since the autocorrelation of a BOC signal has multiple side-peaks, there is a concern about converging on a false lock point or entering an unstable state in a tracking stage. In order to deal with this problem, various researches have been conducted.

In order to overcome the multiple side-peak problem of a BOC signal, Julien proposed a method of eliminating side-peaks by subtracting the cross-correlation between a BOC signal and a PRN signal from BOC autocorrelation. Unfortunately, this technique is applicable only to $BOC_{sin}(n,n)$ (see O. Julien, C. Macabiau, M. E. Cannon, and G. Lachapelle, "ASPeCT: unambiguous sine-BOC(n,n) acquisition/tracking technique for navigation applications," IEEE Trans. Aer. Electron. Syst., vol. 43, no. 1, pp. 150-162, January 2007).

The scheme proposed by Burian eliminates some of the side-peaks, but does not overcome the ambiguity problem (see A. Burian, E. S. Lohan, and M. K. Renfors, "Efficient delay tracking methods with sidelobes cancellation for BOC-modulated signals," EURASIP Journ. Wireless Commun. Network., vol. 2007, article ID. 72626, 2007).

The scheme proposed by Kim et al. completely eliminates side-peaks, but is problematic in that it exhibits worse signal tracking performance for k>1 compared to the BOC autocorrelation function (see S. Kim, D. Chong, and S. Yoon, "A new GNSS synchronization scheme," in Proc. Vehic. Technol. Conf. VTC, CD-ROM, Barcelona, Spain, April 2009).

Recently, a new scheme referred to as a pseudo correlation function based unambiguous delay lock loop (PUDLL) was proposed (see Z. Yao, X. Cui, M. Lu, Z. Feng, and J. Yang, "Pseudo-correlation-function-based unambiguous tracking technique for sine-BOC signals," IEEE Trans. Aer. Electron. Syst., vol. 46, no. 4, pp. 1782-1796, October 2010). This scheme achieves improved signal tracking performance for a BOC signal in which the value of k is small compared to BOC autocorrelation while completely eliminating side-peaks, using cross-correlation between a received BOC signal and specially designed local signals. However, this scheme is problematic in that as the k value increases, the performance thereof becomes increasingly worse than that of the BOC autocorrelation. Furthermore, this scheme is limited in that it is applicable only to $BOC_{sin}(kn,n)$ in which k is an integer.

As a result, there is a demand for a method of eliminating side-peaks that can be universally applied regardless of the type of phase of a BOC signal and the value of k.

SUMMARY OF THE INVENTION

A method of generating a correlation function with no side-peak and a BOC signal tracking system according to the present invention have the following objects.

First, the system and method are intended to eliminate side-peaks from the autocorrelation function of a BOC signal in order to track a BOC signal.

Second, the system and method are intended to provide a correlation function with no side-peak regardless of $BOC_{sin}(kn,n)$ and $BOC_{cos}(kn,n)$ that are distinguished from each other depending on the type of phase of a BOC signal.

Third, the system and method are intended to provide a correlation function from which side-peaks have been eliminated for $BOC_{sin}(kn,n)$ and $BOC_{cos}(kn,n)$ regardless of the value of k.

The objects of the present invention are not limited to the above-described ones, and other objects that have not been described will be apparent to those skilled in the art from the following description.

In accordance with an aspect of the present invention, there is provided a method of generating a correlation function with no side-peak in order to track a Binary Offset Carrier (BOC) signal, including step S1 of generating sub-correlation functions $\{S_i(\tau)\}_{i=0}^{N-1}$; and step S2 of generating a first final correlation function $R_0(\tau)$ by combining some of the sub-correlation functions.

The sub-correlation functions may be expressed by the following equation:

$$S_l(\tau) = \frac{P}{NT_s}\sum_{m=0}^{N-1} h_l h_m \Lambda_{T_s}(\tau + (l-m)T_s).$$

where P is signal power, N is a number of sub-carrier pulses, $h_l$ is a pulse sign of an l-th sub-carrier pulse, $T_s=T_c/N$ is duration of the sub-carrier pulses, $T_c$ is a chip period of a PRN code, and $\Lambda_x(\cdot)$ is a triangular function having a height of x and an area of $x^2$.

The first final correlation function $R_0(\tau)$ may be generated by combining a first (0) sub-correlation function $S_0(\tau)$ and a last (N-1) sub-correlation function $S_{N-1}(\tau)$ according to the following equation:

$$R_0(\tau)=|S_o(\tau)|+|S_{N-1}(\tau)|-|S_0(\tau)-S_{N-1}(\tau)|$$

In accordance with another aspect of the present invention, there is provided a method of generating a correlation function with no side-peak, including step S1 of generating sub-correlation functions $\{S_l(\tau)\}_{l=0}^{N-1}$; step S2 of generating a first final correlation function $R_0(\tau)$ by combining some of the sub-correlation functions; and step S3 of generating a second final correlation function $R_{proposed}(\tau)$ by combining $R_0(\tau)$ with each of the remaining sub-correlation functions that have not been used for the combination at step S2; wherein the BOC signal is one or more of $BOC_{sin}(kn,n)$ and $BOC_{cos}(kn,n)$ signals.

The sub-correlation functions may be expressed by the following equation:

$$S_l(\tau) = \frac{P}{NT_s}\sum_{m=0}^{N-1} h_l h_m \Lambda_{T_s}(\tau + (l-m)T_s).$$

where P is signal power, N is a number of sub-carrier pulses, $h_l$ is a pulse sign of an l-th sub-carrier pulse, $T_s=T_c/N$ is duration of the sub-carrier pulses, $T_c$ is a chip period of a PRN code, and $\Lambda_x(\cdot)$ is a triangular function having a height of x and an area of $x^2$.

The first final correlation function $R_0(\tau)$ may be generated by combining a first (0) sub-correlation function $S_0(\tau)$ and a last (N-1) sub-correlation function $S_{N-1}(\tau)$ according to the following equation:

$$R_0(\tau)=|S_o(\tau)|+|S_{N-1}(\tau)|-|S_0(\tau)-S_{N-1}(\tau)|$$

The second final correlation function $R_{proposed}(\tau)$ may be generated by combining $R_0(\tau)$ with $\{S_l(\tau)\}_{l=0}^{N-1}$ according to the following equation:

$$R_{proposed}(\tau) = R_0(\tau) + \sum_{l=1}^{N-2}\{|S_l(\tau)| + |R_0(\tau)| - |S_l(\tau) - R_0(\tau)|\}$$

In accordance with still another aspect of the present invention, there is provided a system for tracking a BOC signal in order to synchronize the BOC signal, including a reception unit configured to receive a BOC signal; a sub-correlation function generation unit configured to generate sub-correlation functions $\{S_l(\tau)\}_{l=0}^{N-1}$ for the BOC signal received by the reception unit; a first sub-correlation function combination unit configured to generate a first final correlation function $R_0(\tau)$ by combining some of the sub-correlation functions; a second sub-correlation function combination unit configured to generate a second final correlation function $R_{proposed}(\tau)$ by combining $R_0(\tau)$ with each of the remaining sub-correlation functions that have not been used for the combination by the first sub-correlation function combination unit; and a discriminator unit configured to track the signal using the second final correlation function $R_{proposed}(\tau)$ from which side-peaks have been eliminated by the second sub-correlation function combination unit; wherein the BOC signal is one or more of $BOC_{sin}(kn,n)$ and $BOC_{cos}(kn,n)$ signals.

The sub-correlation function generation unit may generate the sub-correlation functions that are expressed by the following equation:

$$S_l(\tau) = \frac{P}{NT_s}\sum_{m=0}^{N-1} h_l h_m \Lambda_{T_s}(\tau + (l-m)T_s).$$

where P is signal power, N is a number of sub-carrier pulses, $h_l$ is a pulse sign of an l-th sub-carrier pulse, $T_s=T_c/N$ is duration of the sub-carrier pulses, $T_c$ is a chip period of a PRN code, and $\Lambda_x(\cdot)$ is a triangular function having a height of x and an area of $x^2$.

The first sub-correlation function combination unit may generate the first final correlation function $R_0(\tau)$ by combining a first (0) sub-correlation function $S_0(\tau)$ and a last (N-1) sub-correlation function $S_{N-1}(\tau)$ according to the following equation:

$$R_0(\tau)=|S_o(\tau)|+|S_{N-1}(\tau)|-|S_0(\tau)-S_{N-1}(\tau)|$$

The second sub-correlation function combination unit may generate the second final correlation function $R_{proposed}(\tau)$ by combining $R_0(\tau)$ with $\{S_l(\tau)\}_{l=0}^{N-1}$ according to the following equation:

$$R_{proposed}(\tau) = R_0(\tau) + \sum_{l=1}^{N-2}\{|S_l(\tau)| + |R_0(\tau)| - |S_l(\tau) - R_0(\tau)|\}$$

BRIEF DESCRIPTION OF THE DRAWINGS

The above and other objects, features and advantages of the present invention will be more clearly understood from the following detailed description taken in conjunction with the accompanying drawings, in which:

FIG. 6 is a graph illustrating the comparison between the performance of the case using an autocorrelation function according to the present invention and the performance of the conventional technique, wherein FIG. 6(a) illustrates tracking error standard deviation (TESD) performance for k when carrier-to-noise ratio (CNR) is 30 dB-Hz, and FIG. 6(b) illustrates TESD performance for CNR when k=4.

DESCRIPTION OF THE PREFERRED EMBODIMENTS

Figure 1:
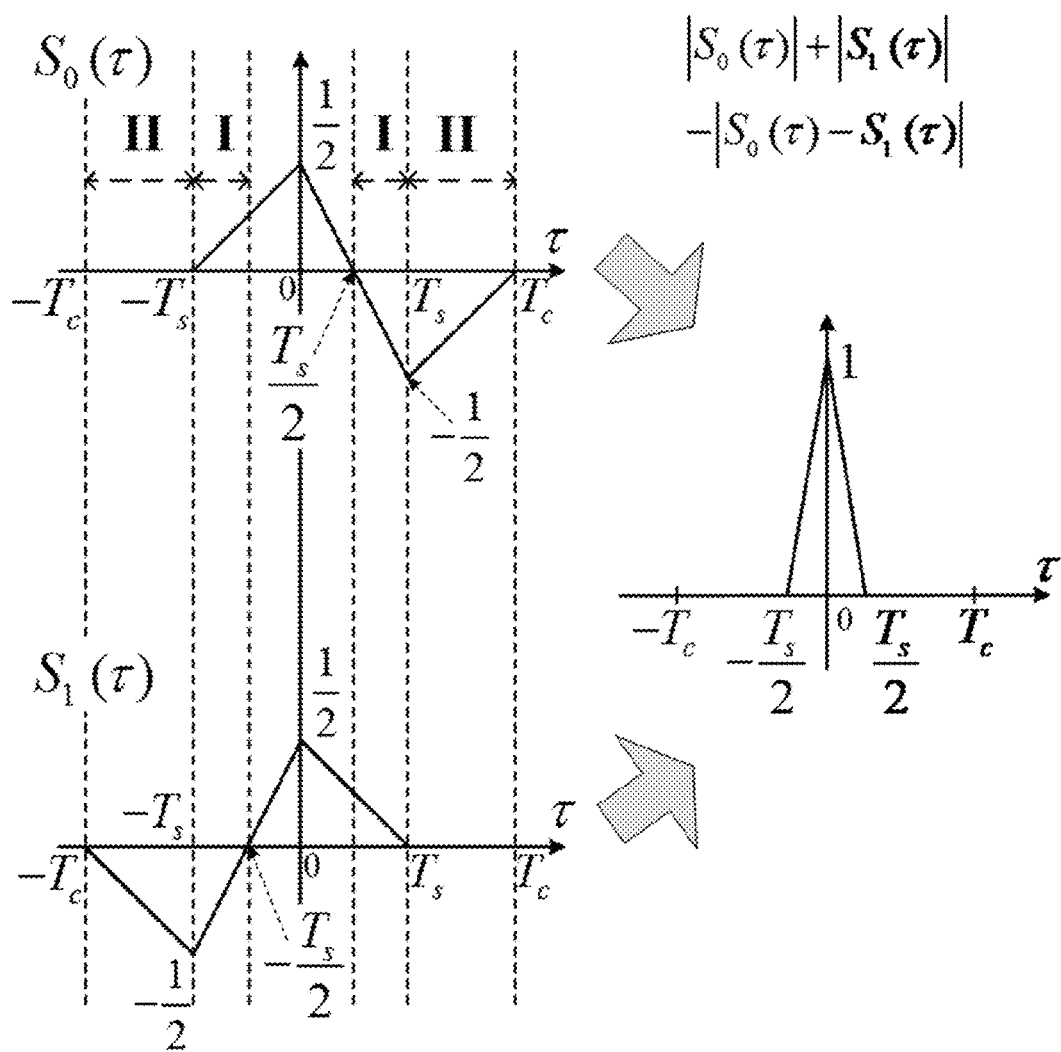
FIG. 1 illustrates sub-correlation functions $S_0(\tau)$ and $S_1(\tau)$ with respect to $S_l(\tau)$ for $BOC_{sin}(n, n)$, and also illustrates an example of a correlation function in which $S_0(\tau)$ and $S_1(\tau)$ have been combined.

A method of generating a correlation function with no side-peak and a BOC signal tracking system 100 will be described in detail below with reference to accompanying drawings.

Prior to the detailed description of the present invention, it is noted that the elements of the present invention herein are divided merely based on the primary functions of the elements. Accordingly, two or more elements that will be described herein may be combined into a single element, or a single element may be divided into two or more elements. Each of the elements that will be described herein may take charge of part or all of the function of another element as well as its primary function, and part of the main function of each of the elements may be performed by another element. Accordingly, the presence of each of the elements that will be described herein should be determined in terms of functionality. For this reason, the elements of the BOC signal tracking system 100 of the present invention may differ from those of FIG. 4 as long as the former elements can accomplish the objects of the present invention.

The principle of the present invention in which side-peaks are eliminated through the combination of sub-correlation functions will be described first.

The baseband equivalent signal of a BOC signal may be expressed by the following Equation 1:

$$b(t) = \sqrt{P} \sum_{i=-\infty}^{\infty} c_i p_{T_c}(t - iT_c) d_{\lfloor iT_c/T \rfloor}(t) s(t) \qquad (1)$$

where P is signal power, $T_c$ is the chip period of a pseudo random noise (PRN) code, $c_i \in \{-1,1\}$ is the i-th chip of the PRN code having period T, $p_\alpha(t)$ is a unit rectangular pulse over interval $[0, \alpha]$, $d_j$ is j-th navigation data, and $\lfloor x \rfloor$ is the largest integer that is not larger than x.

In addition, $$s(t) = \sum_{l=0}^{N-1} h_l p_{T_s}(t - iT_c - lT_s)$$

denotes a rectangular sub-carrier. In this equation, N is the number of sub-carrier pulses, $h_l \in \{1,-1\}$ is the sign of an l-th sub-carrier pulse, and $T_s = T_c/N$ is the duration of the sub-carrier pulses. For $BOC_{sin}(kn,n)$ and $BOC_{cos}(kn,n)$, set $(N, h_l, T_s)$ is specified as $(2k, (-1)^{2ki+l}, 1/(2kn \times 1.023$ MHz$))$ and $(4k, (-1)^{2ki+\lceil l/2 \rceil}, 1/(4kn \times 1.023$ MHz$))$, where $\lceil x \rceil$ is the smallest integer that is not smaller than x.

In an embodiment of the present invention, it is assumed that the PRN code is an independent random variable having +1 and −1 at the same probability and the period T of the code is sufficiently large compared to the chip period. It is also assumed that a pilot channel for tracking is provided such that no data modulation is present during the tracking process (that is, it is assumed that $d_{\lfloor iT_c/T \rfloor}(t)=1$ for all i.

A normalized BOC autocorrelation function may be expressed by the following Equation 2:

$$R(\tau) = \frac{1}{T} \int_0^T b(t)b(t+\tau)dt \qquad (2)$$

$$= \sum_{l=0}^{N-1} \sum_{j=0}^{T/T_c-1} \frac{1}{T} \int_{(jN+l)T_s}^{(jN+l+1)T_s} b(t)b(t+\tau)dt$$

$$= \sum_{l=0}^{N-1} \left\{ \frac{P}{NT_s} \sum_{m=0}^{N-1} h_l h_m \Lambda_{T_s}(\tau + (l-m)T_s) \right\}$$

$$= \sum_{l=0}^{N-1} S_l(\tau)$$

where $\Lambda_x(\cdot)$ is a triangular function having a height of x and an area of $x^2$ and $$S_l(\tau) = \frac{P}{NT_s} \sum_{m=0}^{N-1} h_l h_m \Lambda_{T_s}(\tau + (l-m)T_s)$$

is referred to as an l-th sub-correlation function. From Equation 2, it can be seen that the normalized BOC autocorrelation function is composed of the sum of N saw tooth-shaped sub-correlation functions $\{S_l(\tau)\}_{l=0}^{N-1}$, and thus has a plurality of side-peaks, finally causing an ambiguity problem in a signal tracking stage.

The method of generating a correlation function with no side-peak according to the present invention generates a correlation function with no side-peak. As described above, although various researches have been conducted for this purpose, the present invention is configured to obtain sub-correlation functions, combine sub-correlation functions using the method proposed by the present invention, and generate a final correlation function from which side-peaks have been eliminated.

Correlation function-related terms that will be used in the following description are defined below. An autocorrelation function composed of sub-correlation functions before combination is performed is referred to as an initial autocorrelation function, and a correlation function obtained after combination has been performed is referred to as a final correlation function. Although it will be described later, sub-correlation functions may be combined twice in the present invention. A correlation function generated by the first combination is referred to as a first final correlation function, and a correlation function generated by the second combination is referred to as second final correlation function.

FIG. 1 illustrates sub-correlation functions $S_0(\tau)$ and $S_1(\tau)$ for $BOC_{sin}(n,n)$, and also illustrates an example of a correlation function in which $S_0(\tau)$ and $S_1(\tau)$ have been combined.

FIG. 1 illustrates sub-correlation functions $S_0(\tau)$ and $S_1(\tau)$ normalized using P for $BOC_{sin}(n,n)$ (that is, k=1). From FIG. 1, it can be clearly seen that side-peaks are present in intervals I and II. From FIG. 1, it can be also seen that (i) $S_0(\tau)S_1(\tau)<0$ in interval I, and (ii) $S_0(\tau)S_1(\tau)=0$. Accordingly, in order to completely eliminate side-peaks, $S_0(\tau)$ and $S_1(\tau)$ are combined based on the fact that $|x|+|y|-|x-y|"=0$ when $xy \leq 0$, as shown in the following Equation 3:

$$|S_o(\tau)|+|S_1(\tau)|-|S_0(\tau)-S_1(\tau)| \qquad (3)$$

The results of the combination based on Equation 3 are illustrated in the right side of FIG. 1. From the illustration, it can be seen that side-peaks have been completely eliminated.

Figure 2:
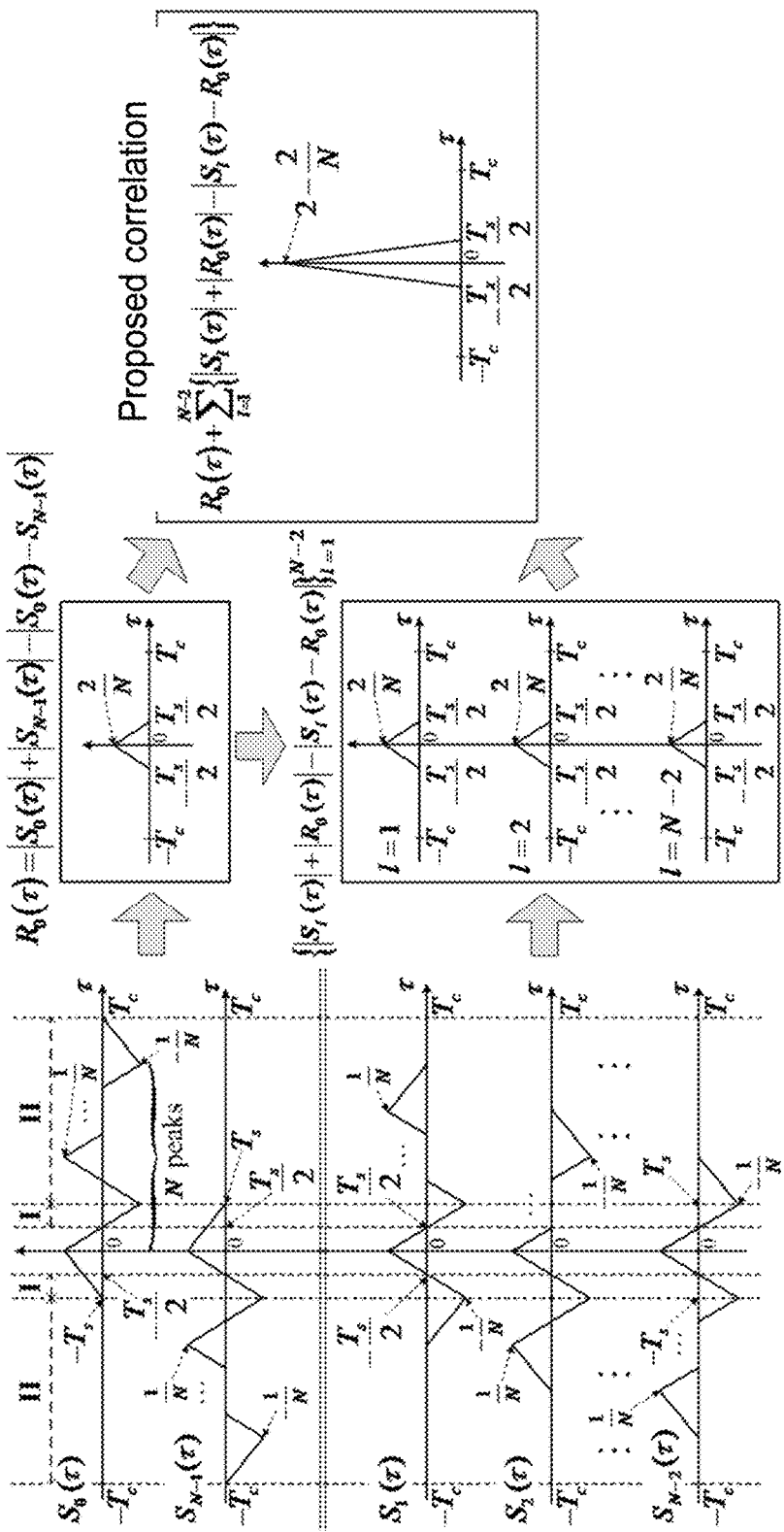
FIG. 2 illustrates sub-correlation functions for $BOC_{sin}(kn, n)$, and also illustrates an example of a correlation function in which the sub-correlation functions have been combined.

The above-described method may be extended in order to eliminate side-peaks from $BOC_{sin}(kn,n)$. FIG. 2 illustrates sub-correlation functions for $BOC_{sin}(kn,n)$, and also illustrates an example of a correlation function in which the sub-correlation functions have been combined.

When k is 2 or more, side-peaks are eliminated by combining $S_0(\tau)$ and $S_{N-1}(\tau)$ according to Equation 4. $R_0(\tau)$ is a first final correlation function.

$$R_0(\tau)=|S_o(\tau)|+|S_{N-1}(\tau)|-|S_0(\tau)-S_{N-1}(\tau)| \qquad (4)$$

Furthermore, a correlation function having higher signal tracking accuracy may be generated through the additional combination of sub-correlation functions based on the first final correlation function $R_0(\tau)$. A second final correlation function that is generated through this process corresponds to another embodiment of the present invention.

Although $R_0(\tau)$ does not have any side-peaks, tracking accuracy based on $R_0(\tau)$ would be higher than that based on a BOC autocorrelation function only for k=1 since absolute value $$\frac{4}{NT_s} = \frac{4}{2kT_s}$$

of the slope of the peak of $R_0(\tau)$ is smaller than $$\frac{4k-1}{2kT_s}$$

of the slope of the main-peak of the BOC autocorrelation function for $k \geq 1.25$. Accordingly, in order to generate a side-peak-free correlation function having the larger absolute value of the slope of the peak for enhanced tracking accuracy, the remaining sub-correlation functions $\{S_l(\tau)\}_{l=1}^{N-2}$ are utilized. Since $R_0(\tau)$ has a value of zero in intervals I and II in which the side-peaks of the sub-correlation functions $\{S_l(\tau)\}_{l=1}^{N-2}$ assume non-zero values, each of the sub-correlation functions $\{S_l(\tau)\}_{l=1}^{N-2}$ is combined with $R_0(\tau)$ as in Equation 3, thereby generating N−2 correlation functions with no side-peak. The N−2 correlation functions from which side-peaks have been eliminated are added to $R_0(\tau)$, thereby constructing a new correlation function that has no side-peaks and a large main-peak, as shown in the following Equation 5. This new correlation function is the second final correlation function.

$$R_{proposed}(\tau) = R_0(\tau) + \sum_{l=1}^{N-2}\{|S_l(\tau)| + |R_0(\tau)| - |S_l(\tau) - R_0(\tau)|\} \qquad (5)$$

From FIG. 2, it can be readily seen that the absolute slope of the peak of $R_{proposed}(\tau)$ is $$\frac{4N-4}{NT_s} = \frac{8k-4}{2kT_s}$$

and is larger than the absolute slope of the main-peak of the BOC autocorrelation function for any value $k \in \{1, 1.5, 2, 2.5, \ldots\}$. Accordingly, using $R_{proposed}(\tau)$, the ambiguity problem can be overcome, and a better signal tracking performance can be achieved compared to that in the case where a BOC autocorrelation function is used.

$R_{proposed}(\tau)$ of Equation 5 is applicable not only to $BOC_{cos}(kn,n)$ but also to generic $BOC_{cos}(kn,n)$. It can be seen that the autocorrelation function for $BOC_{cos}(kn,n)$, which is proposed by the present invention, provides the absolute slope $$\frac{8k-2}{2kT_s}$$

of the peak, which is larger than the absolute slope $$\frac{2k+1/2}{2kT_s}$$

of the main-peak of the BOC autocorrelation function for any value $k \in \{1.5, 2, 2.5, \ldots\}$.

Figure 3:
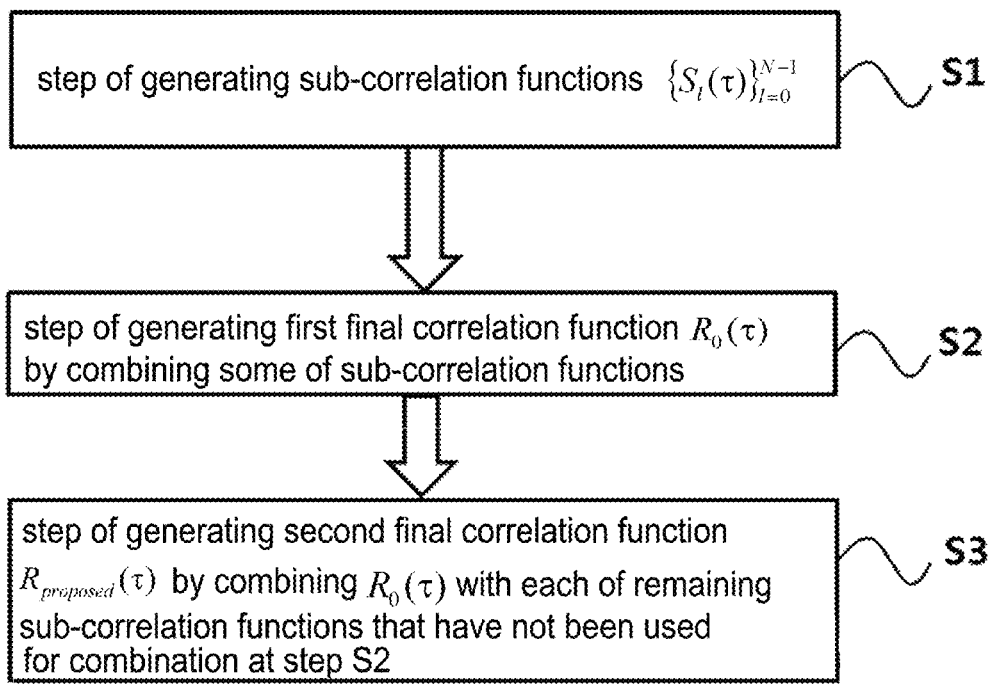
FIG. 3 is a schematic flowchart illustrating a method of generating a correlation function with no side-peak according to an embodiment of the present invention.

FIG. 3 is a schematic flowchart illustrating a method of generating a correlation function with no side-peak according to an embodiment of the present invention. The following embodiment 1 includes only steps S1 and S2, while the following embodiment 2 includes steps S1, S2 and S3 of FIG. 3.

Embodiment 1

A method of generating a correlation function with no side-peak according to this embodiment of the present invention includes step S1 of generating sub-correlation functions $\{S_l(\tau)\}_{l=0}^{N-1}$, and step S2 of generating a first final correlation function $R_0(\tau)$ by combining some of the sub-correlation functions. That is, this corresponds to a method of eliminating side-peaks, which is applicable both to $BOC_{sin}(kn,n)$ and $BOC_{cos}(kn,n)$ signals.

In this case, the initial autocorrelation function is expressed by $$R(\tau) = \sum_{l=0}^{N-1} S_l(\tau),$$

and the sub-correlation functions are expressed by $$S_l(\tau) = \frac{P}{NT_s} \sum_{m=0}^{N-1} h_l h_m \Lambda_{T_s}(\tau + (l-m)T_s).$$

As described above, P is signal power, N is the number of sub-carrier pulses, $h_l$ is the pulse sign of an l-th sub-carrier pulse, $T_s = T_c/N$ is the duration of the sub-carrier pulses, $T_c$ is the chip period of a PRN code, and $\Lambda_x(\cdot)$ is a triangular function having a height of x and an area of $x^2$.

In the method of generating a correlation function with no side-peak, the first final correlation function $R_0(\tau)$ is generated by combining a first (0) sub-correlation function $S_0(\tau)$ and a last (N−1) sub-correlation function $S_{N-1}(\tau)$ according to the following equation:

$$R_0(\tau) = |S_o(\tau)| + |S_{N-1}(\tau)| - |S_0(\tau) - S_{N-1}(\tau)|$$

Embodiment 2

A method of generating a correlation function with no side-peak according to another embodiment of the present invention includes step S1 of generating sub-correlation functions $\{S_l(\tau)\}_{l=0}^{N-1}$, step S2 of generating a first final correlation function $R_0(\tau)$ by combining some of the sub-correlation functions, and step S3 of generating a second final correlation function $R_{proposed}(\tau)$ by combining $R_0(\tau)$ with each of the remaining sub-correlation functions that have not been used for the combination at step S2. In this case, the BOC signal is one or more of $BOC_{sin}(kn,n)$ and $BOC_{cos}(kn,n)$ signals. The present invention is applicable regardless of the type of BOC signal. Furthermore, embodiment 2 is applicable regardless of the k value.

The sub-correlation function $\{S_l(\tau)\}_{l=0}^{N-1}$ and the first final correlation function $R_0(\tau)$ are the same as those of embodiment 1.

The second final correlation function $R_{proposed}(\tau)$ is generated by combining $R_0(\tau)$ with $\{S_l(\tau)\}_{l=0}^{N-1}$ according to $$R_{proposed}(\tau) = R_0(\tau) + \sum_{l=1}^{N-2} \{|S_l(\tau)| + |R_0(\tau)| - |S_l(\tau) - R_0(\tau)|\}.$$

As a result, the present invention proposes a method of generating a new side peak-free correlation function by combining sub-correlation functions using a method proposed by the present invention, rather than using a correlation function generated by simply adding sub-correlation functions.

Figure 4:
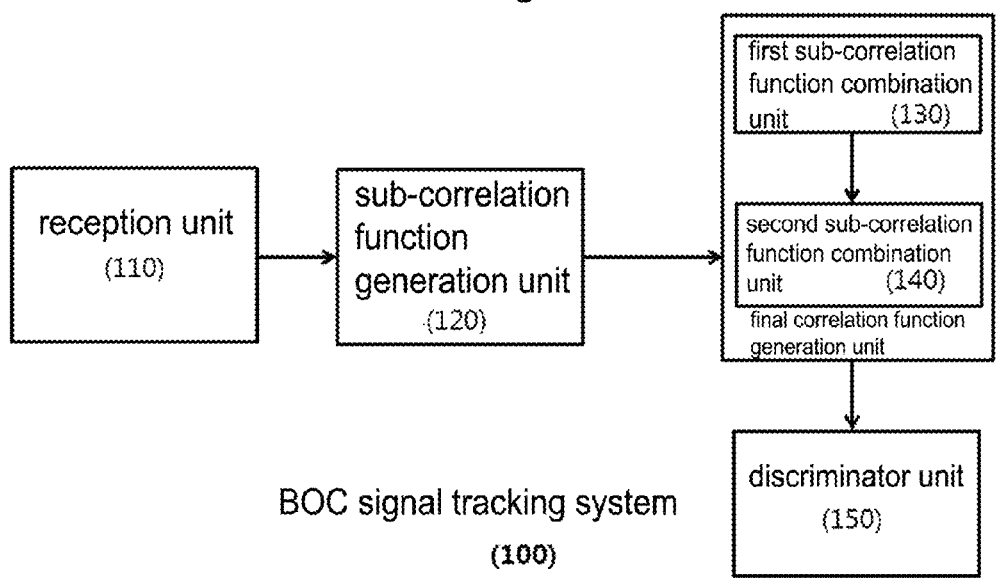
FIG. 4 is a block diagram illustrating the schematic configuration of a BOC signal tracking system according to an embodiment of the present invention.

FIG. 4 is a block diagram illustrating the schematic configuration of a BOC signal tracking system 100 according to an embodiment of the present invention. The BOC signal tracking system 100 according to this embodiment of the present invention is a system to which the above-described method of eliminating side-peaks has been applied.

The BOC signal tracking system 100 according to this embodiment of the present invention includes a reception unit 110 configured to receive a BOC signal, a sub-correlation function generation unit 120 configured to generate sub-correlation functions $\{S_l(\tau)\}_{l=0}^{N-1}$ for the BOC signal received by the reception unit 110, a first sub-correlation function combination unit 130 configured to generate a first final correlation function $R_0(\tau)$ by combining some of the sub-correlation functions, and a discriminator unit 150 configured to track the signal using the first final correlation function $R_0(\tau)$ from which side-peaks have been eliminated by the first sub-correlation function combination unit 130. This is a configuration that corresponds to embodiment 1 of the above-described method of generating a correlation function with no side-peak.

A BOC signal tracking system 100 according to another embodiment of the present invention includes a reception unit 110 configured to receive a BOC signal, a sub-correlation function generation unit 120 configured to generate sub-correlation functions $\{S_l(\tau)\}_{l=0}^{N-1}$ for the BOC signal received by the reception unit 110, a first sub-correlation function combination unit 130 configured to generate a first final correlation function $R_0(\tau)$ by combining some of the sub-correlation functions, a second sub-correlation function combination unit 140 configured to generate a second final correlation function $R_{proposed}(\tau)$ by combining $R_0(\tau)$ with each of the remaining sub-correlation functions that have not been used for the combination by the first sub-correlation function combination unit 130, and a discriminator unit 150 configured to track the signal using the second final correlation function $R_{proposed}(\tau)$ from which side-peaks have been eliminated by the second sub-correlation function combination unit 140. This is a configuration that corresponds to embodiment 2 of the above-described method of generating a correlation function with no side-peak.

In this case, the BOC signal is one or more of $BOC_{sin}(kn,n)$ and $BOC_{cos}(kn,n)$ signals.

The BOC signal received by the reception unit 110 according to the present invention has a sub-carrier having a sine phase or a cosine phase.

FIG. 4 illustrates the BOC signal tracking system 100 including elements up to the discriminator unit 150. The first sub-correlation function combination unit 130 and the second sub-correlation function combination unit 140 may be included in a final correlation function generation unit. The BOC signal tracking system 100 may be applied to the case where k=1 or the case where k>1 depending on whether "the first sub-correlation function combination unit 130" or "the first sub-correlation function combination unit 130 and the second sub-correlation function combination unit 140" included in the final correlation function generation unit operate.

In the above-described BOC signal tracking system 100, the sub-correlation function generation unit 120 generates the sub-correlation functions that are expressed by $$S_l(\tau) = \frac{P}{NT_s} \sum_{m=0}^{N-1} h_l h_m \Lambda_{T_s}(\tau + (l-m)T_s).$$

As described above, P is signal power, N is a number of sub-carrier pulses, $h_l$ is a pulse sign of an l-th sub-carrier pulse, $T_s = T_c/N$ is duration of the sub-carrier pulses, $T_c$ is a chip period of a PRN code, and $\Lambda_x(\cdot)$ is a triangular function having a height of x and an area of $x^2$.

The first sub-correlation function combination unit 130 generates the first final correlation function $R_0(\tau)$ by combining a first (0) sub-correlation function $S_0(\tau)$ and a last (N−1) sub-correlation function $S_{N-1}(\tau)$ according to the equation $R_0(\tau) = |S_o(\tau)| + |S_{N-1}(\tau)| - |S_0(\tau) - S_{N-1}(\tau)|$.

The second sub-correlation function combination unit 140 generates the second final correlation function $R_{proposed}(\tau)$ by combining $R_0(\tau)$ with $\{S_l(\tau)\}_{l=0}^{N-1}$ according to the equation $$P_{proposed}(\tau) = R_0(\tau) + \sum_{l=1}^{N-2} \{|S_l(\tau)| + |R_0(\tau)| - |S_l(\tau) - R_0(\tau)|\}.$$

Figure 5:
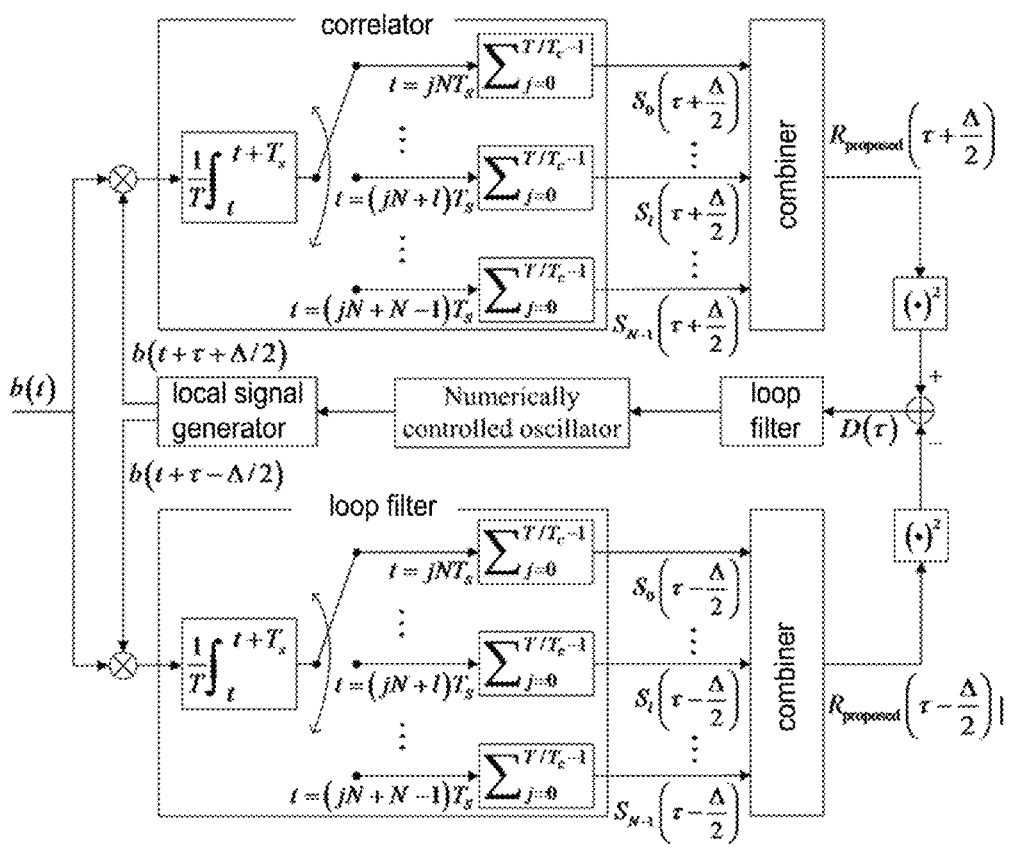
FIG. 5 illustrates an example of a Delay Lock Loop (DLL) structure using the correlation function of the present invention from which side-peaks have been eliminated in order to noncoherently track a BOC signal.

FIG. 5 illustrates an example of a Delay Lock Loop (DLL) structure that is constructed using the correlation function of the present invention from which side-peaks have been eliminated in order to noncoherently track a BOC signal.

In the drawing, τ is the time difference between a received BOC signal and a locally generated BOC signal, and Δ is the early-late spacing of a discriminator. In an actual environment, noise is added to a baseband equivalent signal b(t), as illustrated on the far-left side of FIG. 5.

The received BOC signal is first multiplied by the early version $$b\left(t + \tau + \frac{\Delta}{2}\right)$$

and late version $$b\left(t + \tau - \frac{\Delta}{2}\right)$$

of the BOC signal locally generated at a receiver, and is then correlated and sampled every $T_s$ seconds.

Thereafter, $T/T_c$ samples are collected and summed in each of N branches per sub-carrier pulse.

Through this process, the early version $$\left\{S_l\left(\tau + \frac{\Delta}{2}\right)\right\}_{l=0}^{N-1}$$

and late version $$\left\{S_l\left(\tau - \frac{\Delta}{2}\right)\right\}_{l=0}^{N-1}$$

of the sub-correlation functions $\{S_l(\tau)\}_{l=0}^{N-1}$ can be obtained. Then the early version $$R_{proposed}\left(\tau + \frac{\Delta}{2}\right)$$

and late version $$R_{proposed}\left(\tau - \frac{\Delta}{2}\right)$$

of $R_{proposed}(\tau)$ are obtained, as in Equation 5. Finally, the discriminator output $$D(\tau) = R_{proposed}^2\left(\tau + \frac{\Delta}{2}\right) - R_{proposed}^2\left(\tau - \frac{\Delta}{2}\right)$$

is applied to a loop filter to operate a numerically controlled oscillator (NCO), and the NCO adjusts the clock of a local signal generator until τ=0.

Data about the experimental comparison between the performance of the autocorrelation function according to the present invention and the performance of the conventional technique will be described below.

In order to determine the signal tracking performance of the case using the autocorrelation function proposed by the present invention, various techniques were compared in terms of tracking error standard deviation (TESD) performance. TESD is defined as $$\frac{\sigma}{G}\sqrt{2B_L T_I},$$

where σ is the standard deviation of $D(\tau)|_{\tau=0}$, $B_L$ is the bandwidth of the loop filter, $T_I$ is integration time, and $$G = \frac{dD(\tau)}{d\tau}\bigg|_{\tau=0}$$

is discriminator gain. In these experiments of the present invention, parameters were set such that T=4 ms, $\Delta=T_s/2$, and $B_L=1$.

Figure 6:
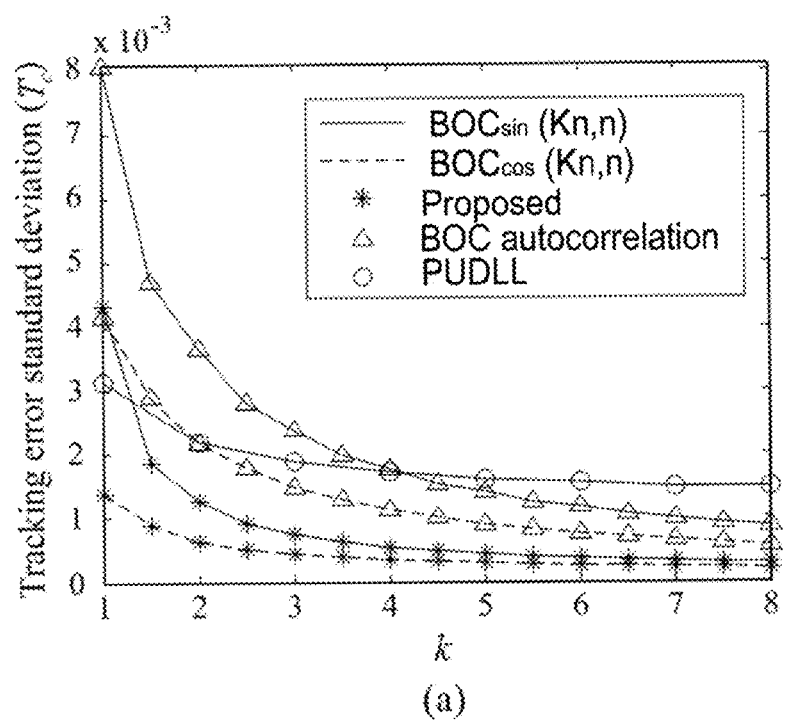
Figure 6:
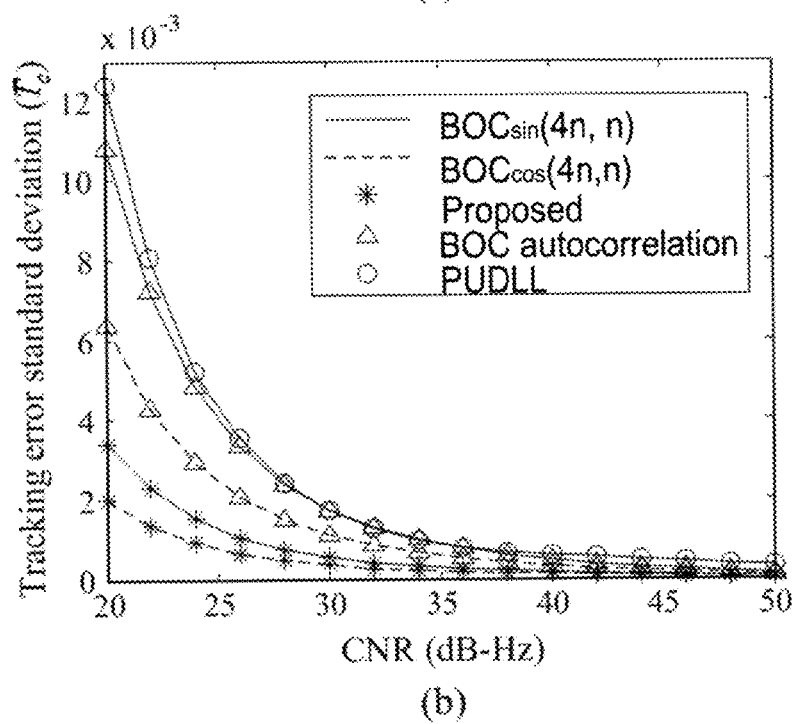

FIG. 6 is a graph illustrating the comparison between the performance of the case using an autocorrelation function according to the present invention and the performance of the conventional technique. FIG. 6(a) illustrates TESD performance for k when carrier-to-noise ratio (CNR) is 30 dB-Hz, and FIG. 6(b) illustrates TESD performance for CNR when k=4. In this case, CNR is defined as $P/N_0$, and $N_0$ is noise power spectral density.

Referring to FIG. 6(a), only the case where k is an integer is illustrated for PUDLL since the scheme is effectively applicable only to $BOC_{sin}(kn,n)$ in which k is an integer, a best-tuned local signal was applied, and related TESD performances are illustrated. From FIG. 6, it can be observed that the autocorrelation function (whose performances are denoted by *) proposed by the present invention exhibited better TESD performance than general BOC autocorrelation function (whose performances are denoted by Δ) and PUDLL (whose performances are denoted by ○).

Referring to FIG. 6(b), it can be clearly observed that the correlation function proposed by the present invention exhibited better TESD performance in the CNR range of interest from 20 to 50 dB-Hz in actual BOC signal tracking than the general BOC autocorrelation function and the PUDLL.

The present invention can be used for the code acquisition systems of a GPS, a Galileo system, a navigation system, etc., and can be also applied to all types of systems using a GPS and Galileo signals, such as an intelligent vehicle control system, vessel and aircraft location control systems.

The method of generating a correlation function with no side-peak and the system for tracking a BOC signal according to the present invention propose a new side-peak elimination method that generates BOC sub-correlation functions and combines the BOC sub-correlation functions by means of a new method.

The proposed method is applicable both to generic $BOC_{sin}(kn,n)$ and $BOC_{ccs}(kn,n)$, and exhibits better signal tracking performance than conventional methods. Furthermore, the proposed method can be simply implemented at a receiver because an auxiliary signal is not required. Using the side-peak elimination method proposed by the present invention, reliable BOC signal tracking can be performed, and the distance measurement error of a new navigation satellite system can be significantly reduced.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of reducing distance estimation error for a given satellite based navigation system, the method comprising:
   receiving, with a receiver comprising an antenna configured to receive signals of a plurality of satellite based navigation systems and a processor configured to process the signals of the plurality of satellite based navigation systems, a Binary Offset Carrier (BOC) signal;
   generating, by the processor, sub-correlation functions $\{S_l(\tau)\}_{l=0}^{N-1}$ for the BOC signal, wherein N is a number of sub-carrier pulses, and a first final correlation function $R_0(\tau)$ having no side-peaks, by combining some of the sub-correlation functions; and
   synchronizing the BOC signal based on a central peak of the correlation function.

2. The method of claim 1, wherein the sub-correlation functions are expressed by the following equation:

$$S_l(\tau) = \frac{P}{NT_s} \sum_{m=0}^{N-1} h_l h_m \Lambda_{T_s}(\tau + (l-m)T_s)$$

where P is signal power, N is a number of sub-carrier pulses, $h_l$ is a pulse sign of an l-th sub-carrier pulse, $T_s = T_c/N$ is duration of the sub-carrier pulses, $T_c$ is a chip period of a PRN code, and $\Lambda_x(\cdot)$ is a triangular function having a height of x and an area of $x^2$.

3. The method of claim 2, wherein the generating of the first final correlation function $R_0(\tau)$ comprises combining a first (0) sub-correlation function $S_0(\tau)$ and a last (N-1) sub-correlation function $S_{N-1}(\tau)$ according to the following equation:

$$R_0(\tau) = |S_0(\tau)| + |S_{N-1}(\tau)| - |S_0(\tau) - S_{N-1}(\tau)|.$$

4. A method of reducing distance estimation error for a given satellite based navigation system, the method comprising:
   receiving, with a receiver comprising an antenna configured to receive signals of a plurality of satellite based navigation systems and a processor configured to process the signals of the plurality of satellite based navigation systems, a Binary Offset Carrier (BOC) signal;
   generating, by the processor,
   sub-correlation functions $\{S_l(\tau)\}_{l=0}^{N-1}$ for the BOC signal,
   a first final correlation function $R_0(\tau)$ having no side-peaks by combining some of the sub-correlation functions,
   a second final correlation function $R_{proposed}(\tau)$ having no side-peaks by combining $R_0(\tau)$ with each of the remaining sub-correlation functions that have not been used for the combination upon generating the first final correlation function $R_0(\tau)$ to generate a plurality of correlation functions from which side-peaks have been eliminated and adding the plurality of correlation functions to $R_0(\tau)$;
   synchronizing the BOC signal based on a central peak of the first final correlation function and the second final correlation function,
   wherein the BOC signal is either one or both of $BOC_{sin}(kn,n)$ and $BOC_{cos}(kn,n)$ signals.

5. The method of claim 4, wherein the sub-correlation functions are expressed by the following equation:

$$S_l(\tau) = \frac{P}{NT_s} \sum_{m=0}^{N-1} h_l h_m \Lambda_{T_s}(\tau + (l-m)T_s)$$

where P is signal power, N is a number of sub-carrier pulses, $h_l$ is a pulse sign of an l-th sub-carrier pulse, $T_s = T_c/N$ is duration of the sub-carrier pulses, $T_c$ is a chip period of a PRN code, and $\Lambda_x(\cdot)$ is a triangular function having a height of x and an area of $x^2$.

6. The method of claim 5, wherein the generating of the first final correlation function $R_0(\tau)$ comprises combining a first (0) sub-correlation function $S_0(\tau)$ and a last (N-1) sub-correlation function $S_{N-1}(\tau)$ according to the following equation:

$$R_0(\tau) = |S_0(\tau)| + |S_{N-1}(\tau)| - |S_0(\tau) - S_{N-1}(\tau)|.$$

7. The method of claim 6, wherein the generating of the second final correlation function $R_{proposed}(\tau)$ comprises combining $R_0(\tau)$ with $\{S_l(\tau)\}_{l=0}^{N-1}$ according to the following equation:

$$R_{proposed}(\tau) = R_0(\tau) + \sum_{l=1}^{N-2} \{|S_l(\tau)| + |R_0(\tau)| - |S_l(\tau) - R_0(\tau)|\}.$$

8. A system for tracking a Binary Offset Carrier (BOC) signal from a satellite of a satellite navigation system in order to synchronize the BOC signal, the system comprising:
   a receiver comprising an antenna configured to receive signals from a plurality of satellite navigation signals including signals comprising the BOC signal; and
   a processor configured to process the signals of the plurality of satellite navigation systems, the processor comprising:
   a sub-correlation function generator configured to generate sub-correlation functions $\{S_l(\tau)\}_{l=0}^{N-1}$ for the received BOC signal;
   a first sub-correlation function combiner configured to generate a first final correlation function $R_0(\tau)$ having no side-peaks by combining some of the sub-correlation functions;
   a second sub-correlation function combiner configured to generate a second final correlation function $R_{proposed}(\tau)$ having no side-peaks by combining $R_0(\tau)$ with each of the remaining sub-correlation functions that have not been used for the combination by the first sub-correlation function combiner to generate a plurality of correlation functions from which side-peaks have been eliminated and adding the plurality of correlation functions to $R_0(\tau)$; and
   a discriminator configured to track the BOC signal using the second final correlation function $R_{proposed}(\tau)$ from which side-peaks have been eliminated by the second sub-correlation function combiner;
   wherein the BOC signal is either one or both of $BOC_{sin}(kn,n)$ and $BOC_{cos}(kn,n)$ signals.

9. The system of claim 8, wherein the sub-correlation function generator is configured to generate the sub-correlation functions that are expressed by the following equation:

$$S_l(\tau) = \frac{P}{NT_s} \sum_{m=0}^{N-1} h_l h_m \Lambda_{T_s}(\tau + (l-m)T_s)$$

where P is signal power, N is a number of sub-carrier pulses, $h_l$ is a pulse sign of an l-th sub-carrier pulse, $T_s=T_c/N$ is duration of the sub-carrier pulses, $T_c$ is a chip period of a PRN code, and $\Lambda_x(\cdot)$ is a triangular function having a height of x and an area of $x^2$.

10. The system of claim 9, wherein the first sub-correlation function combiner is configured to generate the first final correlation function $R_0(\tau)$ by combining a first (0) sub-correlation function $S_0(\tau)$ and a last (N−1) sub-correlation function $S_{N-1}(\tau)$ according to the following equation:

$$R_0(\tau)=|S_o(\tau)|+|S_{N-1}(\tau)|-|S_0(\tau)-S_{N-1}(\tau)|.$$

11. The system of claim 10, wherein the second sub-correlation function combiner is configured to generate the second final correlation function $R_{proposed}(\tau)$ by combining $R_0(\tau)$ with $\{S_l(\tau)\}_{l=0}^{N-1}$ according to the following equation:

$$R_{proposed}(\tau) = R_0(\tau) + \sum_{l=1}^{N-2} \{|S_l(\tau)| + |R_0(\tau)| - |S_l(\tau) - R_0(\tau)|\}.$$

* * * * *